Oct. 23, 1956
N. C. AMEN
2,767,417
DISPENSER AND APPLICATOR FOR HEAVY LUBRICANTS
Filed Dec. 28, 1954
3 Sheets-Sheet 1
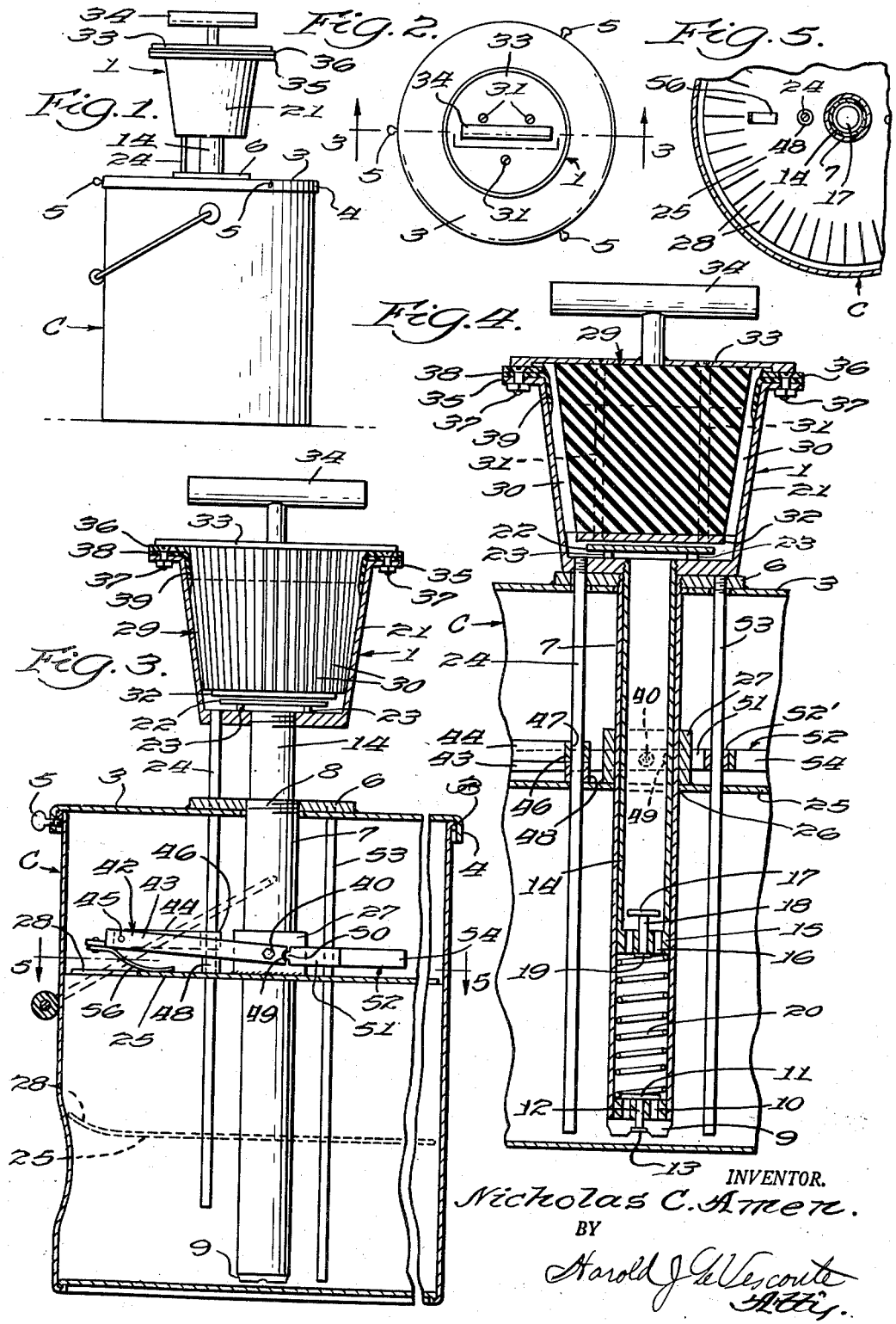
INVENTOR.
Nicholas C. Amen.
BY
Harold J. LeVesconte
Atty.

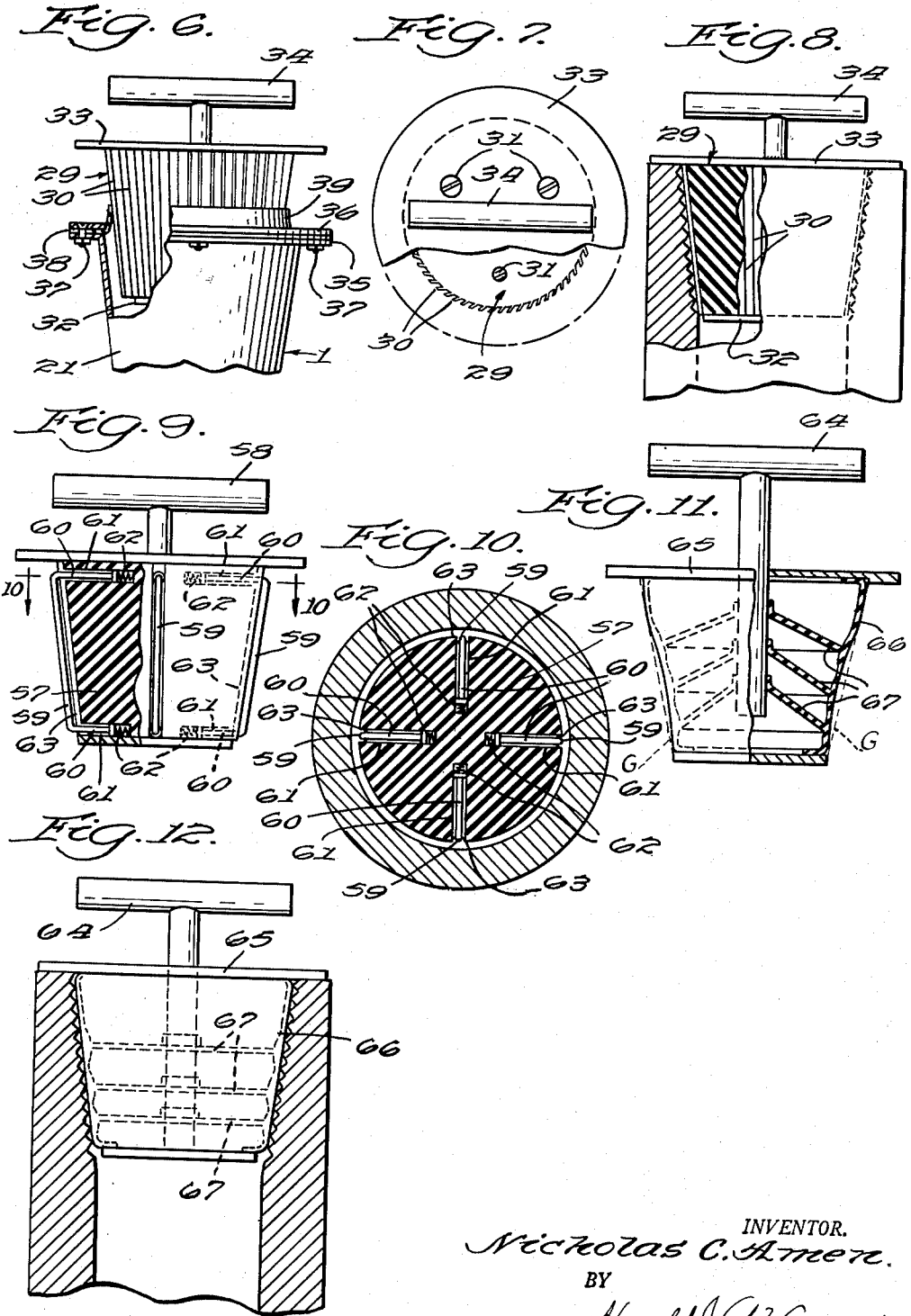

Oct. 23, 1956  N. C. AMEN  2,767,417
DISPENSER AND APPLICATOR FOR HEAVY LUBRICANTS
Filed Dec. 28, 1954  3 Sheets-Sheet 3
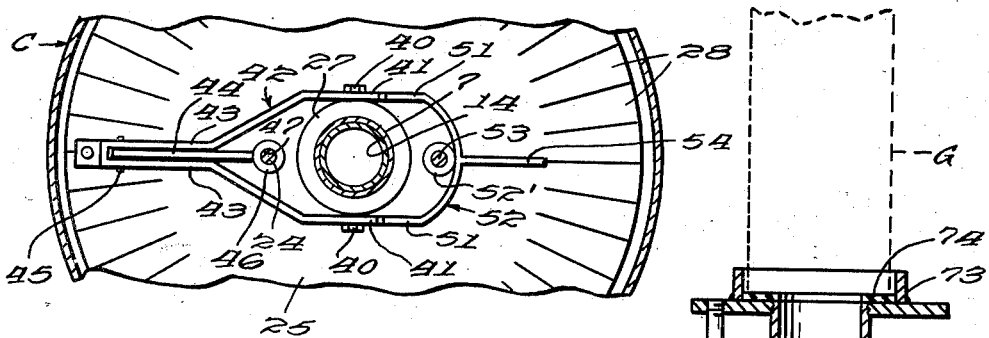
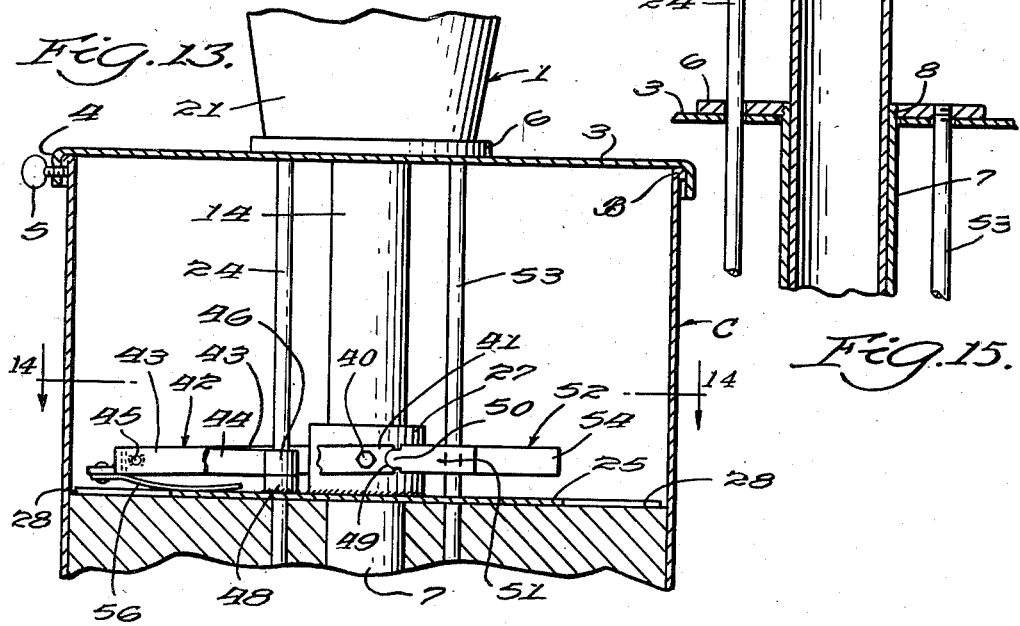
INVENTOR.
Nicholas C. Amen.
BY
Harold J. LeVisconte
Attys.

United States Patent Office 2,767,417
Patented Oct. 23, 1956

2,767,417

DISPENSER AND APPLICATOR FOR HEAVY LUBRICANTS

Nicholas C. Amen, Glendale, Calif.

Application December 28, 1954, Serial No. 478,131

2 Claims. (Cl. 15—121.2)

This invention relates to lubricant applicators and more particularly to an improved means for applying lubricant to the joints of well drilling tool strings. In deep well drilling equipment the drilling is performed by various types of drilling bits mounted on the end of a string of hollow, tubular drill rods which are connected together by taper threads. The connecting threads are so tightly screwed together that unless properly lubricated as an incident to forming the interconnection, extreme difficulty will be experienced in unscrewing them with consequent loss of time which is very costly and also damage and possible scrapping of the end of the drill rod or tool which is also very costly. Many proposals have been advanced for the efficient application of lubricant to tool joint threads, but to date there have been none that have met with extensive favor and for the most part drillers still prefer to rely on the practice of applying the lubricant (a heavy grease) to the internally threaded component of the joint with a paddle in spite of the fact that such procedure is time consuming, that there is danger that foreign matter will get into the exposed lubricant supply or be trapped in the threads, or that the threads will be incompletely covered with lubricant. In deep well drilling, the cost can be reckoned in terms of dollars per minute and any procedure which is apt to consume unnecessary time either in making or breaking a joint can be extremely costly.

The present invention takes all of these factors into account and has for its principal object the provision of an organized apparatus for the quick and complete application of lubricant to tool joints from a supply which as an incident to use of the apparatus is maintained enclosed to prevent the contamination thereof by the entrance of foreign matter.

Another object of the invention is to provide a tool joint lubricator means which is adapted for use with the standard containers in which tool joint lubricant is supplied to users.

A further object of the invention is to provide a tool joint lubricating apparatus in which the amount of lubricant dispensed at each operation of the apparatus is that which is actually required for the complete lubrication of the threads of a joint.

Still another object of the invention is to provide a tool joint lubricating apparatus including an applicator means which is constructed and arranged to apply the lubricant to all of the threaded surface under pressure conditions which insure that the lubricant will be applied to the entire threaded surface of the tool joint component to which it is applied.

A still further object of the invention is to provide a tool joint lubricating apparatus in which the foregoing objectives are realized in practice, which is simple in construction and economical to manufacture, and which does not require skill for effective operation and use.

With the foregoing objects in view, together with such additional objects and advantages as may subsequently appear, the invention resides in the parts, and in the construction, combination and arrangement of parts, disclosed, by way of example, in the following specification of certain satisfactory modes of execution of the invention; reference being had to the accompanying drawings which form a part of said specification and in which drawings:

Fig. 1 is a side elevation of one embodiment of the invention applied to a container of lubricant, Fig. 2 is a top plan view of Fig. 1, Fig. 3 is an enlarged scale side elevational, sectional view taken on the staggered line 3—3 of Fig. 2 showing the relative position of the parts at the start of a dispensing operation; unnecessary portions of the container being omitted, Fig. 4 is a further enlarged fragmentary sectional view similar to Fig. 3 but showing the pump means and applicator in medial section and showing the positions of the parts at the time of completion of loading the applicator preparatory to applying the lubricant to a tool joint.

Fig. 5 is a fragmentary top plan view taken on the line 5—5 of Fig. 3 showing in reduced scale certain details of the follower plate component of the apparatus, Fig. 6 is a fragmentary side elevation of the upper portion of the apparatus, partly in section, showing the loaded applicator being withdrawn therefrom, Fig. 7 is a top plan view of Fig. 6 with the applicator top plate partially broken away to show the position of the lubricant retaining fin elements in their normal position, Fig. 8 is a side elevation showing the applicator forced into the end of a tool joint component with resultant expulsion of lubricant from the applicator into the threads of the component, Fig. 9 is a side elevation, partly in section of another form of applicator useful with the dispensing means of the invention, Fig. 10 is a top plan sectional view of Fig. 9 taken on the line 10—10 thereof, Fig. 11 is a side elevation, partly in section of another form of applicator adapted for use with the dispensing means of the invention, Fig. 12 is a side elevation similar to Fig. 8 but showing the applicator shown in Fig. 11 in the position in which lubricant carried thereby is discharged into the threads of a tool joint component, Fig. 13 is an enlarged sectional side elevation partly in section and with certain parts broken away showing details of the follower plate actuating means, Fig. 14 is a fragmentary, sectional top plan view taken on the line 14—14 of Fig. 13, Fig. 15 shows details of the adaptation of the invention to loading the cylinder or container of a grease gun.

Referring to the drawings and particularly Figs. 1 to 8 thereof, the illustrated embodiment of the invention comprises a dispensing component generally indicated by 1 and an applicator indicated generally by 2; said applicator being adapted to be charged or loaded with a predetermined amount of lubricant by the dispensing means and thereafter being carried to the tool joint to be lubricated and caused to distribute the lubricant into the threads of the tool joint component as will be later described in detail.

The dispensing component 1 includes a base 3 formed as a cover for a lubricant container C; said base having a depending skirt portion 4 fitting over the bead B at the top of the container and having a series of thumbscrews 5 by which it is firmly attached to the upper edge of the container in place of the normal container cover. At its center, the base 3 is provided with a flange 6 in which a pump cylinder 7 is secured by threads 8; said cylinder extending from the top surface of said base downwardly to a point closely spaced from the bottom of the container. At its lower end, the cylinder is provided with an end member 9 having a series of ports 10 extending therethrough and carrying a check valve member 11 overlying the inner ends of said ports; said valve member being mounted on a pin 12 slidably mounted in the member 9 and provided with a head 13 to limit the extent of movement by the valve member 11.

Slidably mounted in the cylinder is a hollow, piston 14 having an end member 15 at its lower end provided with ports 16 extending therethrough and carrying a check valve member 17 normally closing the inner ends of said ports; said valve member being carried by a pin 18 slidably mounted in the end member 15 and having a head 19 at its lower end to limit the extent of movement of the valve member 17. Disposed within the cylinder 7 and extending between the upper face of the cylinder end member 9 and the lower end face of the piston end member 15 is a compression spring 20 effective normally to move the piston 14 upwardly to the extent determined by the full extension of the spring.

The piston 14 projects above the upper end of the cylinder 7 and the upper end of the piston carries an inverted, frusto-conical receptacle 21 of somewhat larger dimensions internally than the tool joint threads with which the apparatus is to be used, as will subsequently appear; said receptacle at its bottom having a plate 22 overlying the open end of the piston and being supported in spaced relation by a series of supporting pins 23. The bottom wall of the receptacle 21 carries a depending rod 24 which extends through an opening in the base 3 and the follower plate 25 into the container for a distance sufficient to just clear the bottom thereof when the piston is moved downwardly to the extreme end of its stroke (see Fig. 4).

It will be noted that the portion of the apparatus above described comprises a pump effective upon reciprocation of the piston 14 to draw in lubricant through the bottom of the cylinder and the check valves and discharge it into the receptacle 21 at the top of the piston. The apparatus includes means for insuring that the lubricant will be all drawn toward the bottom of the container evenly comprising the follower plate 25 formed of thin, resilient material and loosely fitting the inner diameter of the container; said follower plate having a central opening 26 surrounded by a collar 27 slidably engaging the cylinder 7. The outer edge of this plate is slitted to provide a series of tongue elements 28 adapted to yield to accommodate dents and like irregularities in the container walls as indicated in Fig. 3; said follower plate being actuated by means to be later described.

The above described portion of the invention comprises the dispensing component and assuming that it is to be put into use, the cover is removed from a container and the dispenser component substituted therefor. The piston and receptacle carried thereby are reciprocated until the lubricant begins to protrude beneath the plate 22 and the dispenser is ready for loading an applicator preparatory to lubricating a tool joint.

The applicator shown in Figs. 1 to 8 comprises an inverted, frusto-conical body 29 formed of rubber and having a plurality of closely spaced, resilient fins 30 extending at right angles to the end surfaces of said body and projecting outwardly from said side surface along lines which are tangential to a circle of about half the major diameter of said body as best shown in Fig. 7. The outer diameters of said body as measured at the tips of said fins is substantially equal to the corresponding inner diameters of the receptacle 21. The body 29 is secured by screws 31 between a bottom plate 32 and a top plate 33; the latter being provided with a handle 34.

The upper end of the receptacle 21 is provided with an outwardly extending flange 35 and secured on this flange by a clamp ring 36 and screws 37 is a wiper element 38 formed of thin, resilient and flexible material having a portion 39 thereof projecting laterally over the edge of the larger inner diameter of the receptacle comprising an opening in said element which is about equal to the smaller diameter of the body portion 29 with the fins 30 thereof in their normal position.

Assuming that the dispenser component is made ready for use as above described, the applicator is placed in the receptacle with incident downward movement of the wiper edge as shown in Fig. 1. Then by pushing down on the applicator handle the pump is caused to inject lubricant into the receptacle and the lubricant will fill the spaces between the walls of the receptacle and applicator and between the fins 30; the capacity of the pump preferably being such that a single stroke will fill all of said spaces. Then after the spring 20 has been allowed to lift the pump piston back to its normal position, the applicator is lifted from the receptacle and in so doing the wiper element will first lift upwardly as shown in Fig. 6 and will wipe off any excess lubricant from the applicator. The applicator and the load of lubricant thus applied to the surface thereof is then carried to the tool joint component to be lubricated and is pressed into the internally threaded end thereof. This will cause the fins 30 to be folded down closely against the body 29 with resultant expulsion of the lubricant from between them. A slight turning movement of the applicator at the time of application in a direction to assist the fins in bending down against the applicator body may be applied. The applicator is then lifted from the tool joint component and the lubricant will have been forced uniformly into all of the threads and will fill all of the threads. The applicator is then returned to and placed in the receptacle of the applicator to be ready for the next use. It is to be noted that the operation is quickly performed, generally taking only a few seconds, that the lubricant is positively forced into all of the threads uniformly, and that the lubricant supply is at all times protected from external contamination. Further, it will be obvious that use of the above described apparatus does not require any skill nor does it require care in use to effect the proper lubrication of tool joints.

Pivotally mounted on the collar 27 by screws 40 are the ends 41, 41 of a yoke member 42; said yoke extending radially horizontally away from the collar 27 above the follower plate 25 and terminating adjacent the wall of the container C in spaced parallel arm portions 43, 43 between which one end of a bar 44 is pivotally mounted on a pin 45. The bar extends toward the collar 27 and is provided with a vertically disposed collar portion 46 provided with a bore 47 through which the rod 24 extends with a slight amount of play. The upper surface of the follower plate 25 is provided with a collar 48 through which the rod 24 extends into the contents of the container. The ends 41, 41 of the yoke 42 extend slightly beyond the screws 40 and terminate in notches 49 which engage mating protuberances 50 on the ends 51, 51 of a second yoke element 52 including a collar 52′ slidably and slightly rockably mounted on a rod 53 disposed diametrically opposite the rod 24 and having its upper end fixed in the flange 6 and thence extending downwardly through the follower plate 25 and terminating in a free end disposed adjacent to the bottom of the container. The yoke element 52 includes an arm 54 extending radially from the rod 53 toward the wall of the container which serves as a weight tending constantly to rock the yoke element clockwise as viewed in Figs. 3 and 15 to initiate the gripping of the rod 53 as will hereinafter be explained. In a pumping operation, the cramping action of the collar portion 47 of the bar 44 on the rod 24 carries the bar down with it until the collar 47 thereof engages the collar 48 on the follower plate 25 and thereafter the rod 24 slips through the collar portion 47 on its continued downward movement. This downward movement of the bar 44 carries the outer end of the yoke 42 with it and this produces an upward component of movement on the ends 41, 41 of the yoke. However due to the engagement of the yoke 52 on the rod 53, this action produces a downward movement on the follower plate. The proportions of the yokes and the pivot points thereon are sufficient to insure that the extent of downward movement of the follower plate at each stroke of the pump is substantially equal to the volume of lubricant taken by the pump so that danger of cavitation of the lubricant is eliminated. Preferably, the outer end of the yoke 42 is provided with spring means 56 constantly effective to urge said outer end upwardly with resultant canting of the bar 44 on the rod 24 and consequent engagement with the rod 24 at the start of the down stroke in a pumping action. On the upstroke of the piston, the parts will first return to the position shown in Fig. 3 and then the rod 24 will slide upwardly through the collar 46 for the remainder of the upstroke.

Figs. 9 and 10 show a form of applicator which may be employed as an alternative to the form shown in the preceding figures. This form of applicator includes an inverted, frustoconical body 57 having an outer configuration which fits the tops of the threads within a tool joint coupling and having a handle 58 extending above its upper surface. The body 57 is provided with a plurality of spring biased rib elements 59 extending in planes containing the axis of the body member along the outer face thereof in spaced relation to each other and having end portions 60, 60 extending in holes 61 extending radially into the body 57 adjacent the top and bottom surfaces of the body. Springs 62, 62 engage the ends of said members within the holes 61 and urge the members outwardly from the body 57. The body 57 is provided with grooves 63 in which the rib elements 59 may be seated with their outer surfaces flush with the plane of the outer surface of the body. The use of the applicator is substantially the same as the first described form thereof. The applicator is placed in the receptacle 21 and the receptacle and pump means operated thereby is operated with discharge of lubricant into the space between the outer surface of the body 57 and the inner face of the receptacle 21; the extended rib elements serving to center the applicator in the receptacle with resultant application of an even layer of the grease on the surface of the body 57. When the thus coated body is placed in a tool joint and pressed downwardly, the rib elements will be compressed and the grease will be forced into the threads. A slight turning action as the applicator is removed from the tool joint will break the adhesion of the grease to the body 57 and leave the tool joint with a smooth coating of lubricant which completely fills the threads.

Figs. 11 and 12 show a modified form of a second type of applicator in which the applicator is formed from a hollow flexible and resilient body having a side wall which can be circularly collapsed and expanded. The applicator there illustrated includes a handle 64 slidably mounted in and extending through the center of a circular plate 65 to the under side of which a hollow resilient body element 66 of generally inverted frustoconical configuration is attached; the side walls of said body being normally concave as shown in Fig. 11. The body includes a series of spaced circular walls 67 inclining slightly upwardly from their point of juncture with the interior face of the side wall of the body member and secured to the portion of the handle 64 which extends through and below the plate 65. When this applicator is placed in the receptacle 21 and the pump actuated, the grease will fill the concave space defined by the side wall of the body member as shown by the dotted lines G in Fig. 11. When the applicator with its load of grease is placed in a tool joint and the handle 64 is pressed downwardly, the walls 66 will be moved to an approximately horizontal position (see Fig. 12) causing the entire outer side surface of the body member to contact the threads and consequently discharging the grease into the threads.

In the resilient side wall type of applicator, the wiper element 39 may be dispensed with, if desired.

Referring finally to Fig. 15, there is shown the adaptation of the invention for the filling of grease guns and like apparatus. In this form of the invention the receptacle 21 is replaced by a shallow cup 73 having a resilient gasket 74 in the bottom thereof. In use, the nozzle of the grease gun is removed and the open end of the cylinder G is held tightly against the gasket 74 while the pump means is reciprocated with resultant delivery of the lubricant directly into the cylinder; the pump being reciprocated until the cylinder has been filled.

Thus, there has been provided an efficient means for delivering lubricant to an applicator which is then transferred to a tool joint and by simple manipulation of the applicator, the tool joint is quickly and completely lubricated preparatory to being connected in the tool string.

Additionally the dispensing or pump means is equally desirable for the filling of grease gun cylinders.

While the foregoing specification discloses the best modes of execution of the invention presently known to me, the invention is not to be deemed to be limited to the exact forms above disclosed, and it will be understood that the invention embraces all such changes and modifications in the parts, and in the construction, combination and arrangement of parts as shall come within the purview of the appended claims.

I claim:

1. An applicator for filling the threads of the internally threaded end of a tool joint component while the component is suspended at the top of a well as an incident to attachment of the next component in making up a drill string; said applicator comprising a lubricant carrying body insertable into the threaded end of the component and having a length equal to the length of the threads, a handle carrying said body, and a plate carried by said handle and interposed between said body and the portion of said handle gripped by the user; said plate being effective by engagement with the end of the component to limit the extent of entry of said body into the threaded end of the component; said body having a series of compressible ribs formed on the outer surface thereof extending parallel to the axial line of the threads and defining grooves in which a grease type lubricant is carried within said grooves when said ribs are in their extended position; said compressible ribs being deflected by forcible engagement with the component threads with resultant discharge of lubricant carried thereby into the threads.

2. The combination with an applicator as claimed in claim 1 of means for applying a predetermined quantity of grease type lubricant to the surface of said applicator; said means comprising pump means having an intake connected to a supply source of grease type lubricant and having a discharge connected to a receptacle having an open upper end, said receptacle being complementary to the normal extended ribs of said applicator and into which said applicator body is inserted with said plate engaging said open end of said receptacle to close said receptacle and thus providing a space about said applicator body which when filled with grease supplied by said pump, determines the quantity of grease carried by said grooves on said applicator body.

References Cited in the file of this patent

UNITED STATES PATENTS

| | | |
|---|---|---|
| 358,539 | Camp | Mar. 1, 1887 |
| 849,786 | Hildenbrand | Apr. 9, 1907 |
| 1,051,129 | Lapham | Jan. 21, 1913 |

(Other references on following page)

UNITED STATES PATENTS

| | | |
|---|---|---|
| 1,317,523 | Meyer | Sept. 30, 1919 |
| 1,715,329 | Prescott | May 28, 1929 |
| 1,720,376 | Pierce et al. | July 9, 1929 |
| 1,850,870 | Featherstone | Mar. 22, 1932 |
| 2,242,154 | Tomkin | May 13, 1941 |
| 2,246,874 | Burge et al. | June 24, 1941 |
| 2,315,054 | Heber | Mar. 30, 1943 |
| 2,378,624 | Edwards | June 19, 1945 |
| 2,431,725 | Bauer | Dec. 2, 1947 |
| 2,496,381 | Cummings | Feb. 7, 1950 |
| 2,629,121 | Petre | Feb. 24, 1953 |
| 2,636,658 | Baumer et al. | Apr. 28, 1953 |
| 2,642,034 | Griffin et al. | June 16, 1953 |

FOREIGN PATENTS

| | | |
|---|---|---|
| 500,020 | Great Britain | Feb. 1, 1939 |